United States Patent
French

(10) Patent No.: US 6,209,942 B1
(45) Date of Patent: Apr. 3, 2001

(54) EXTRUDED BUNK STAKES, BUNKS AND BUNK POCKETS FOR LOGGING TRUCKS AND TRAILERS

(75) Inventor: Craig French, Suring, WI (US)

(73) Assignee: Great Lakes Manufacturing, Inc., Suring, WI (US)

( * ) Notice: Subject to any disclaimer, the term of this patent is extended or adjusted under 35 U.S.C. 154(b) by 0 days.

(21) Appl. No.: 09/409,667

(22) Filed: Sep. 30, 1999

(51) Int. Cl.⁷ ..................................... B60P 7/06
(52) U.S. Cl. ................ 296/43; 296/26.13; 296/3
(58) Field of Search .................. 296/43, 26.13, 296/7, 8, 3, 6, 182, 36, 26.12

(56) References Cited

U.S. PATENT DOCUMENTS

| | | |
|---|---|---|
| 1,507,229 * | 9/1924 | Bosley .................................. 296/43 |
| 2,088,223 | 7/1937 | Witte . |
| 2,100,255 | 11/1937 | Larson . |
| 2,299,192 | 10/1942 | Tormyn . |
| 3,177,579 | 4/1965 | Singleton, Jr. . |
| 3,184,945 | 5/1965 | Hornak et al. . |
| 3,245,714 * | 4/1966 | Blair ................................ 296/182 X |
| 3,285,786 | 11/1966 | Katz . |
| 3,374,029 | 3/1968 | Barker . |
| 3,391,563 | 7/1968 | Donegan . |
| 3,648,351 | 3/1972 | Kibler . |
| 3,692,354 * | 9/1972 | Tuerk ................................ 296/43 X |
| 3,712,639 | 1/1973 | Rysdam, II . |
| 3,811,724 | 5/1974 | Woodward . |
| 4,309,054 * | 1/1982 | Allen ................................ 296/43 X |
| 4,375,893 | 3/1983 | Curtis . |
| 4,427,230 * | 1/1984 | Avny ................................ 296/43 |
| 4,668,000 | 5/1987 | Jokela . |
| 5,320,396 * | 6/1994 | Petelka ................................ 296/43 |
| 5,611,286 | 3/1997 | Liermann . |
| 5,618,078 * | 4/1997 | Aberle ................................ 296/43 |

FOREIGN PATENT DOCUMENTS

160390 * 9/1957 (SE) ................................ 296/43

OTHER PUBLICATIONS

"Alucar Titan 9 10 Bolsters" Mediamikko/Kirjapaino Stericca, 1995.

* cited by examiner

*Primary Examiner*—Joseph D. Pape
(74) *Attorney, Agent, or Firm*—Birch, Stewart, Kolasch & Birch, LLP

(57) ABSTRACT

A stake, bunk and bunk pocket are used to constrain logs on the bed of a truck or trailer. The stakes can be inserted or removed from the bunk pocket which is attached to the end of the bunk. All elements are composed of lightweight hardened aluminum. The bunk and the stake are formed using an extrusion process and have internal members or webs that add additional strength and are also formed during the extrusion process. Stakes and bunks come in various lengths to accommodate the various sizes of vehicles, the load capacity of the vehicles, and the density and corresponding weight of the logs. This invention makes stakes easier to work with as their weight is significantly reduced. These stakes, due to their reduced weight, may be repositioned from the ground 16. Bunks, bunk pockets and stakes are all resistant to corrosion, exceed federal requirements for load carrying capacity and allow for a reduction in gross vehicle weight thereby offering greater load capacity before the vehicle reaches its maximum legal weight.

20 Claims, 17 Drawing Sheets

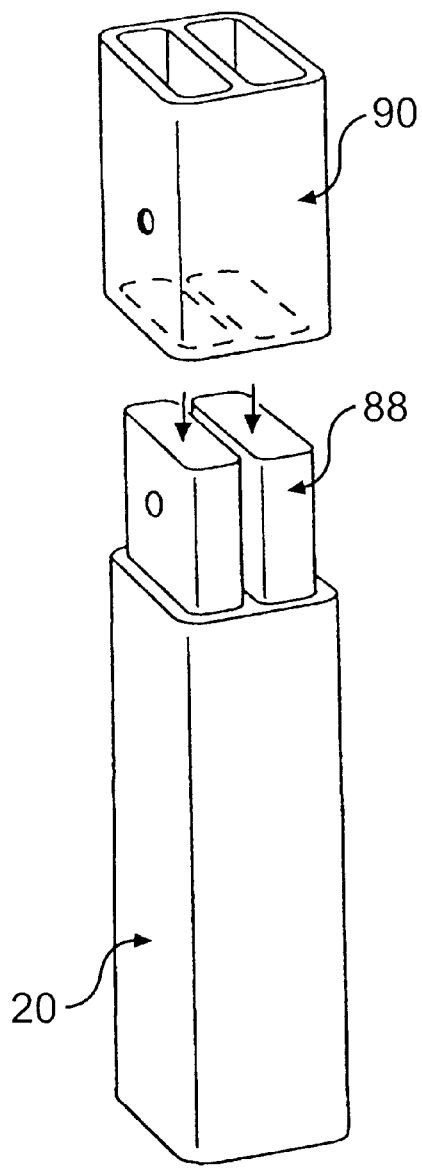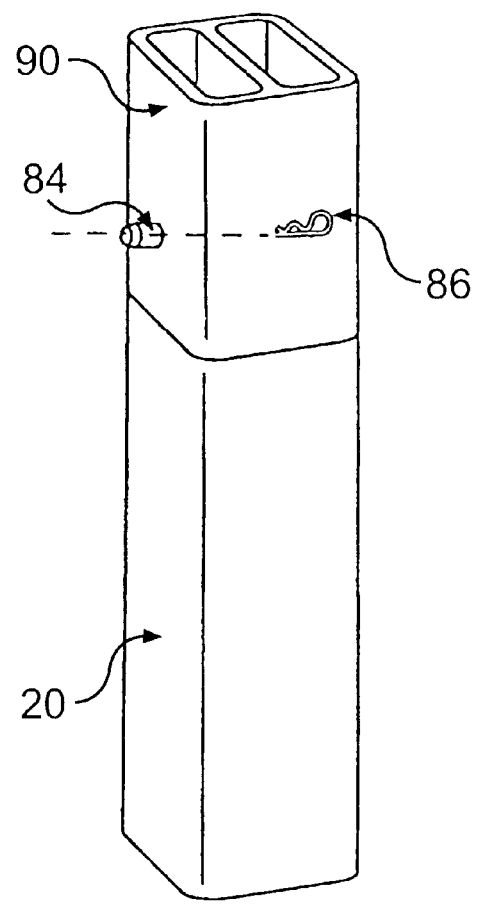
*FIG. 6A*  *FIG. 6B*

FIG. 15A
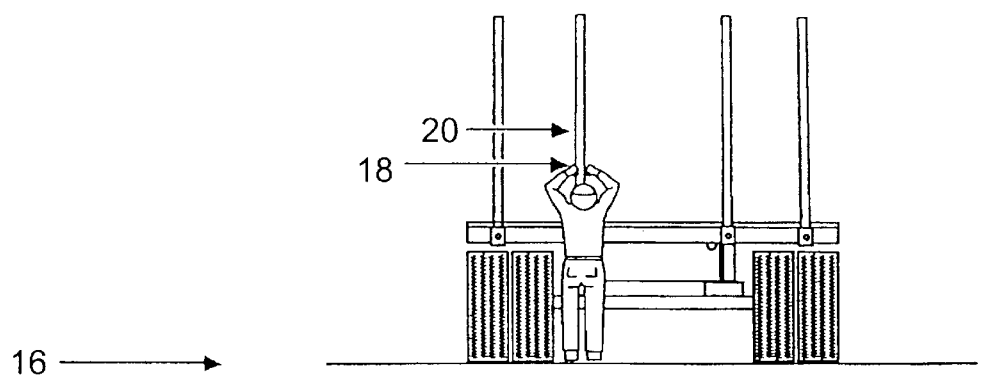
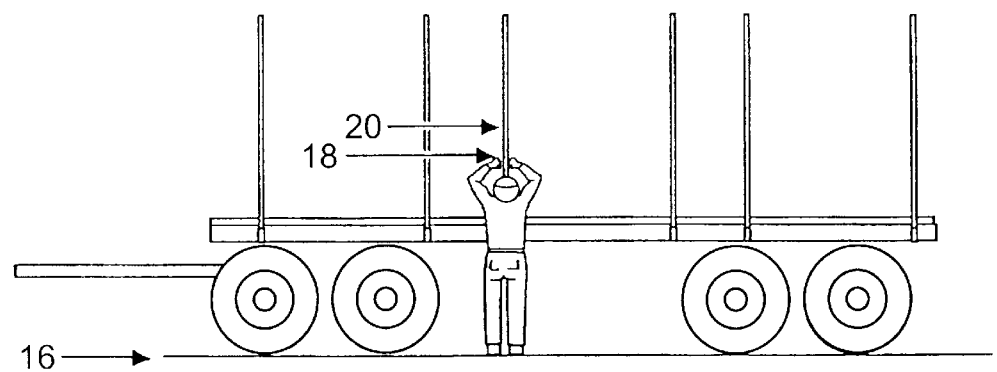
FIG. 15B

EXTRUDED BUNK STAKES, BUNKS AND BUNK POCKETS FOR LOGGING TRUCKS AND TRAILERS

BACKGROUND OF THE INVENTION

1. Field of the Invention

The present invention relates to a stake, bunk and bunk pocket used to constrain logs on the bed of a truck or trailer.

2. Description of the Background Art

Most logging trucks or trailers have for many years used different materials for supporting the logs on top of the bed of the vehicles during the transportation of freight. In the beginning, wood was used for the stake materials which are vertically extending posts which fit into lateral fixtures. These lateral fixtures are referred to as bunks. Each bunk has an opening in both ends referred to as a bunk pocket. The bunks are spaced along the length of the vehicle, and the bunk pockets are sized to match the stakes which fit vertically into the bunk. Federal regulations specify that stakes must have a specific yield strength, making wood stakes obsolete.

The prior art has focused on methods of extending the stakes as in U.S. Pat. Nos. 3,811,724, 4,668,000, 3,712,639 and 5,611,286. These patents focused on extending the height of the stakes using mechanical or hydraulics methods, and did not focus on the unique properties of the materials used to create the stake. Stakes are normally used to constrain high or low density logs on logging trucks or trailers. The density of the logs determine the length of the stake. The type of stake today is typically steel, with some stakes being telescoping. Depending on the density of the logs and the quantity of logs, stakes may need to be changed to longer or shorter ones on a given load so they conform to federal safety standards and still offer the maximum load carrying capacity.

Logging companies prefer to place the maximum load on each truck or trailer to maximize the cost effectiveness of each load. Typically trucks or trailers have had to replace the existing stakes with new stakes of greater height or strength depending on whether they are carrying high or low density logs. Working and moving steel stakes is difficult because of their weight and operators must get up on the bed of the vehicle to reposition the stakes. When the truck or trailer has not met the maximum weight limit based on load restrictions, some steel stakes can be extended either manually or automatically to increase or decrease the load capacity.

Typically steel and wood have had to be extremely heavy to provide the necessary strength to constrain the load. This cuts down on actual deliverable cargo since the weight of the stakes displaces some of the deliverable cargo. Heavy, bulky stakes are difficult to manage or control and create a more hazardous condition for workers adding to the total cost of hauling logs due to injuries and lost time. Normally, aluminum or other lightweight metals do not have the strength to support the heavy loads inherent in the logging industry.

SUMMARY OF THE INVENTION

It is therefore an object of the present invention to provide a stake, bunk, and bunk pocket used to constrain logs on the bed of a truck or trailer. The stakes can be inserted or removed from the bunk pocket which is attached to the end of the bunk. All elements are composed of lightweight hardened aluminum. The bunk and the stake are formed using an extrusion process and have internal web members that add additional strength and are also formed during the extrusion process. The stakes and bunks come in various lengths to accommodate the various sizes of vehicles, the load capacity of the vehicles, the density and corresponding weight of the logs.

This invention makes stakes easier to work with as their weight is significantly reduced. These stakes, due to their reduced weight, may be repositioned from the ground. The stakes, bunks, and bunk pockets are all resistant to corrosion, exceed federal requirements for load carrying capacity and allow for a reduction in gross vehicle weight thereby offering greater load capacity before the vehicle reaches its maximum legal weight.

The instant invention has a unique structural and material combination allowing for reduced weight, repositioning from the ground, corrosion resistance, safety, ease in handling, reduces work time lost due to injuries, and strength capacity that exceeds the federal regulations governing vehicles hauling logs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6A is an exploded perspective view of a first embodiment of a stake extension of the present invention;

FIG. 6B is a perspective view of the first embodiment of the stake extension of the present invention in an assembled condition;

FIG. 15A is a rear view of a trailer showing a stake being repositioned; and

FIG. 15B is a side view of a trailer showing a stake being repositioned.

DETAILED DESCRIPTION OF THE PREFERRED EMBODIMENTS

This is a description of the preferred stake 20, bunk 40, and bunk pocket 60. However, it is to be understood that the present invention is not limited to the preferred materials, structural configurations or dimensions as described herein, and that the invention can be changed or modified without departing from the scope of this invention.

Figure 1A:
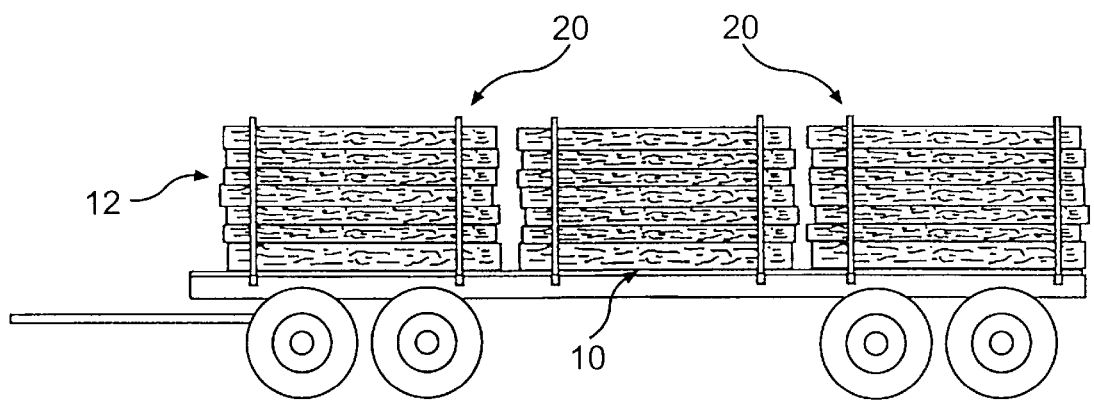
FIG. 1A is a side view of a trailer showing a plurality of stakes positioned along the side thereof.
Figure 1B:
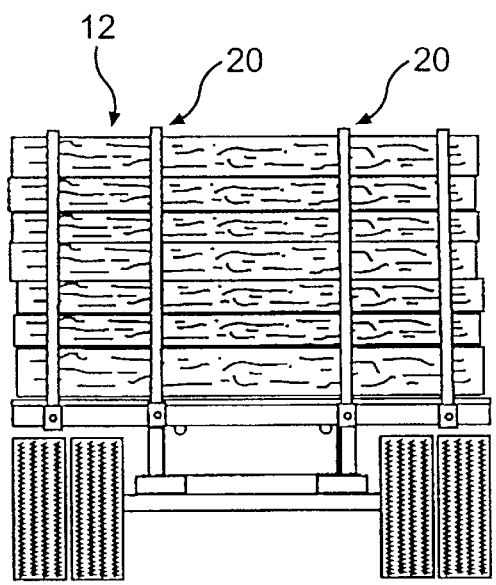
FIG. 1B is a rear view of the trailer showing a plurality of stakes positioned along the end thereof.

As shown in FIG. 1, a plurality of stakes 20 are positioned along the sides of a trailer 10 and along the end of the trailer 10 for constraining the logs 12.

Figure 2:
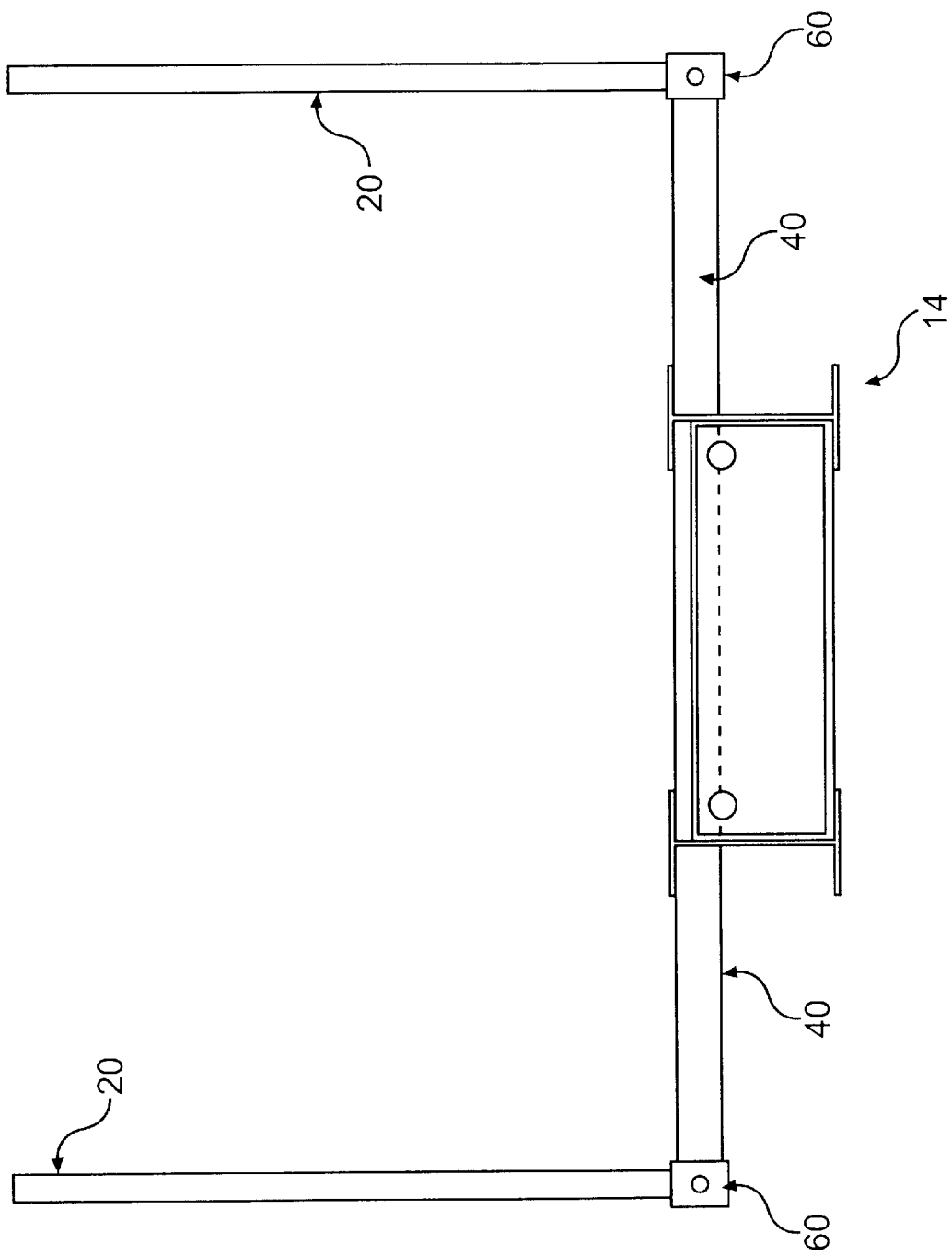
FIG. 2 is an end view of a truck or trailer frame including vertical stakes, bunk pockets, and bunks of the present invention.

Referring now to FIG. 2, an end view of the trailer 10 reveals that a bunk 40 extends across the width of the frame 14 of the trailer 10. The stakes 20 are attached to the ends of the bunk 40 by inserting an end of the stake 20 into a bunk pocket 60 fixed to the end of the bunk 40. The bunk 40 can be seen positioned flush with the top of the frame 14 of the truck or trailer 10, yet underneath the truck bed. A plurality of bunks 40 are typically attached under, or on top of a frame 14 of the truck or trailer 10 in multiples and extend perpendicular to the length of the truck or trailer 10.

Figure 3:
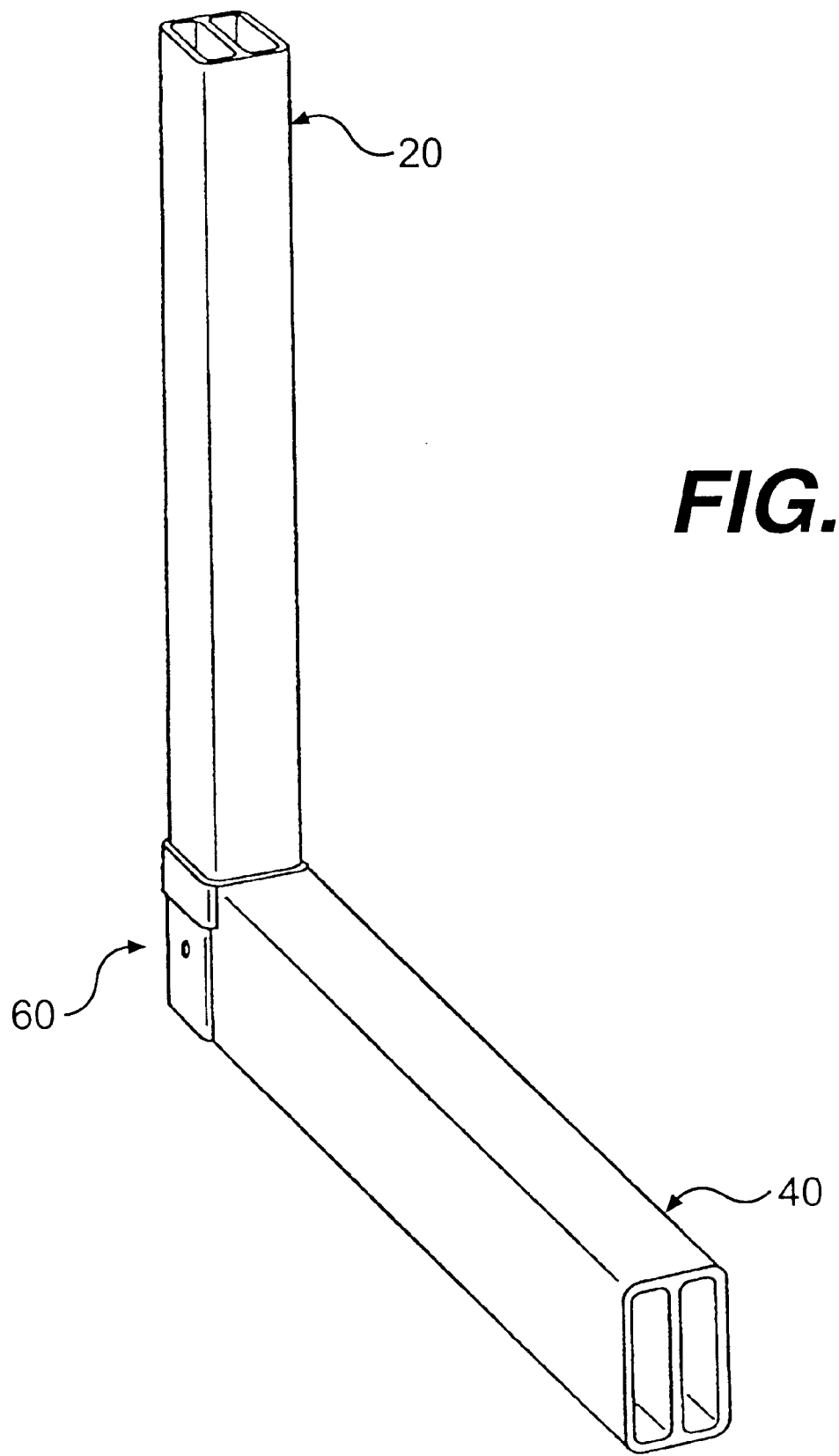
FIG. 3 is a perspective view showing a vertical stake, a bunk pocket, and a bunk of the present invention in an assembled condition.

FIG. 3 illustrates the vertical stake 20 inserted into the bunk pocket 60 which is attached at the end of the bunk 40. The stake 20 is vertically positionable in the horizontal bunk pocket 60. Note that the bunk 40 would continue under the bed of the truck or trailer 10, and have a bunk pocket 60 and stake 20 inserted in the opposite end as shown in FIG. 2. The bunk 40 shown has a 4000 Lb. uniformly distributed weight limit.

Figure 4:
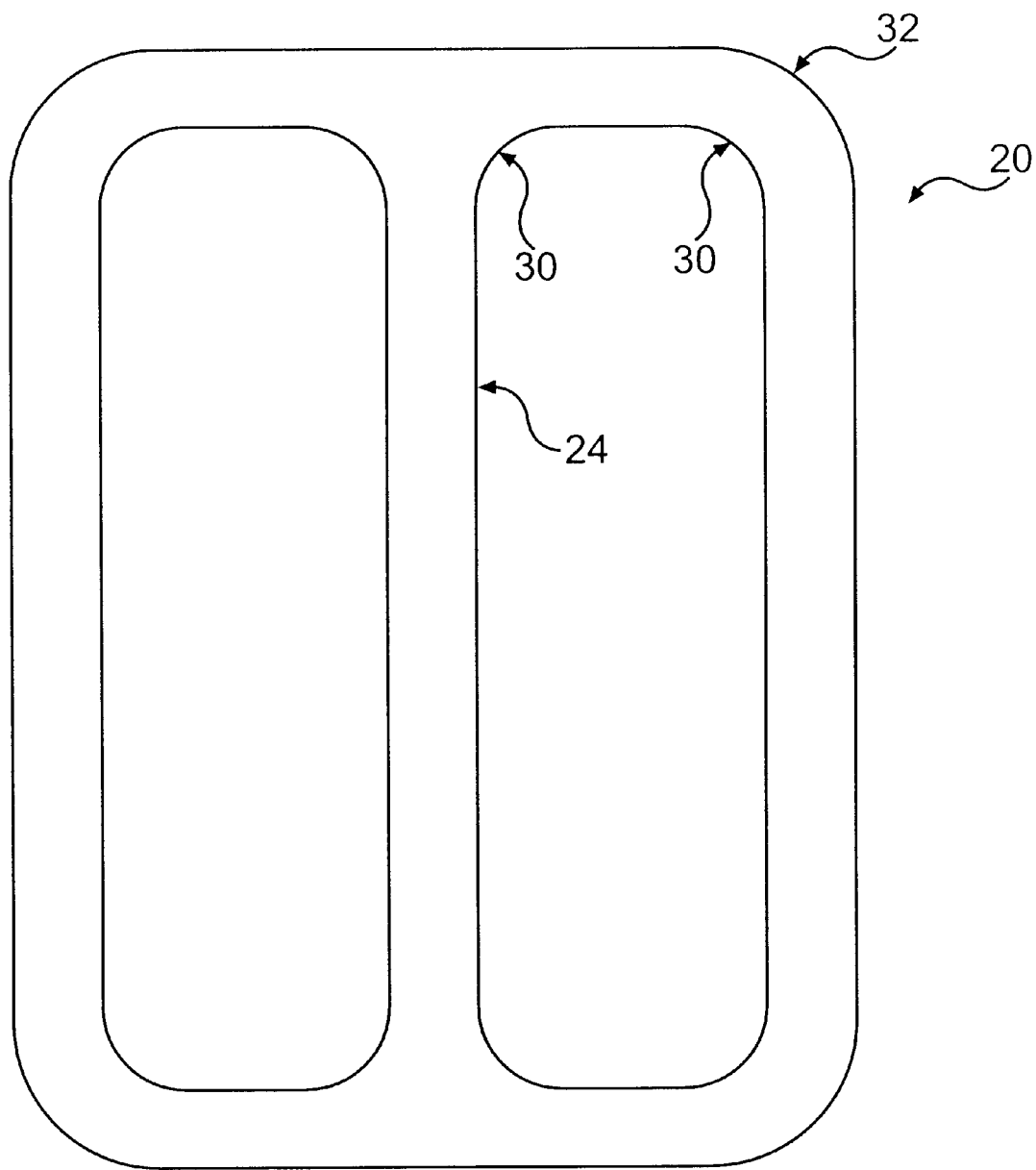
FIG. 4 is an end view of a stake of the present invention.

FIG. 4 is an end view of the extruded stake 20, which shows an internal wall or web 24 extending centrally across the stake 20. The web 24 transverses the interior of the stake 20 from front to back. The stake 20 is manufactured using an extrusion method, from aluminum or other lightweight metals or materials.

In this example, the overall width of the stake 20 is 3.00", and the overall depth of the stake 20 is 4.00". The thickness of the wails is 0.29", and the web 24 has a thickness of 0.29". The web 24 is formed during the extrusion process, and extends the complete length of the interior of the extruded stake 20. The extruded stake 20 has radiused corners 30,32. The radius of the inside corners 30 is 0.29", and the radius of the outside corners 32 is 0.50". The web 24, along with the radiused corners, adds significant strength to the stake 20. It should be noted that the present invention is not limited to these particular dimensions.

Figure 5:
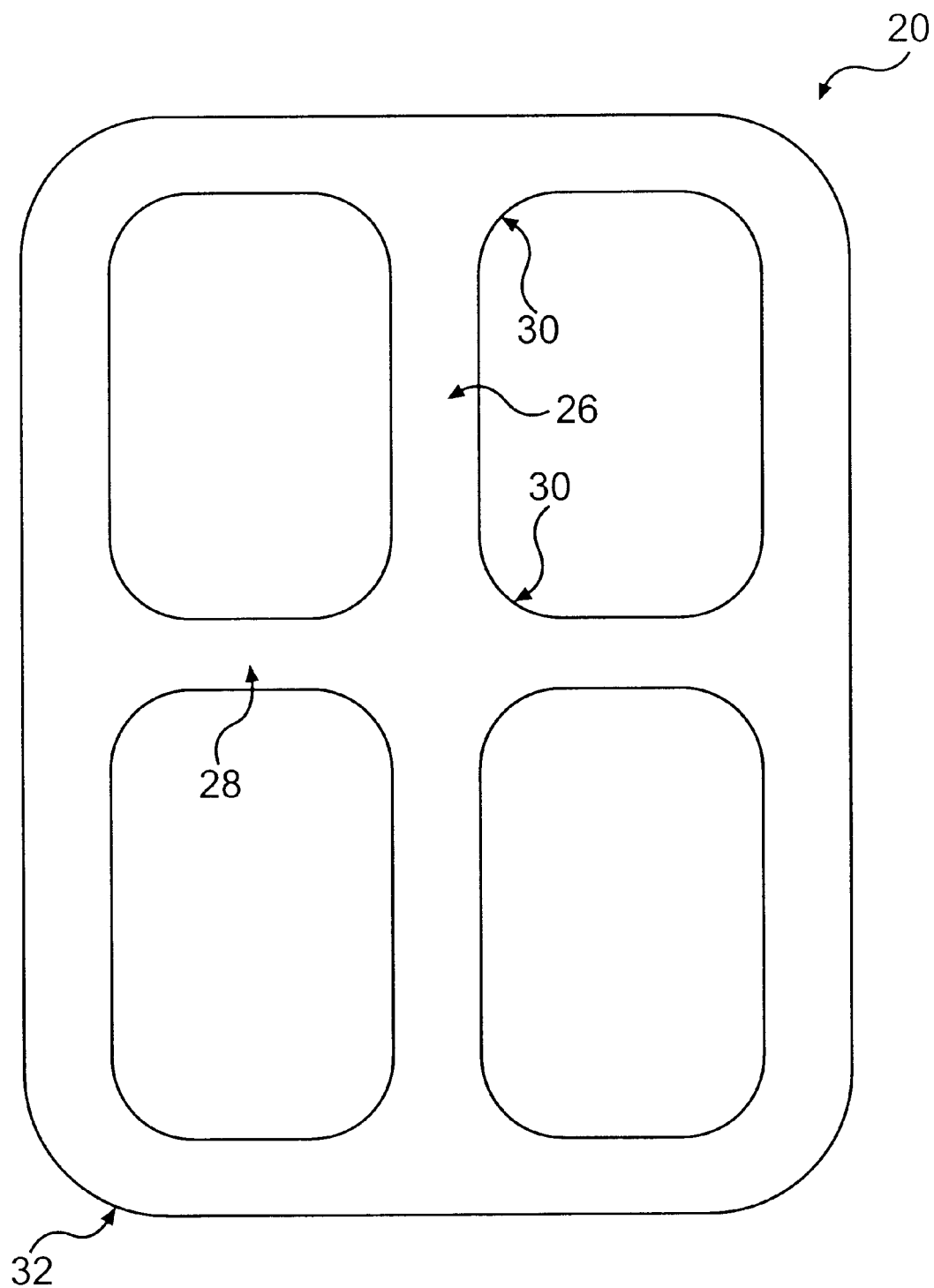
FIG. 5 is an end view of a second embodiment of a stake of the present invention.

FIG. 5 shows an end view of an alternate embodiment of the stake 20 of the present invention The stake 20 of FIG. 5 is a lightweight, extruded webbed stake 20 with not only a first web 26 extending perpendicular to the force of the load, but also a second web 28 extending parallel to the force of the load to further increase the dimensional stability and strength of the stake 20.

Figure 6C:
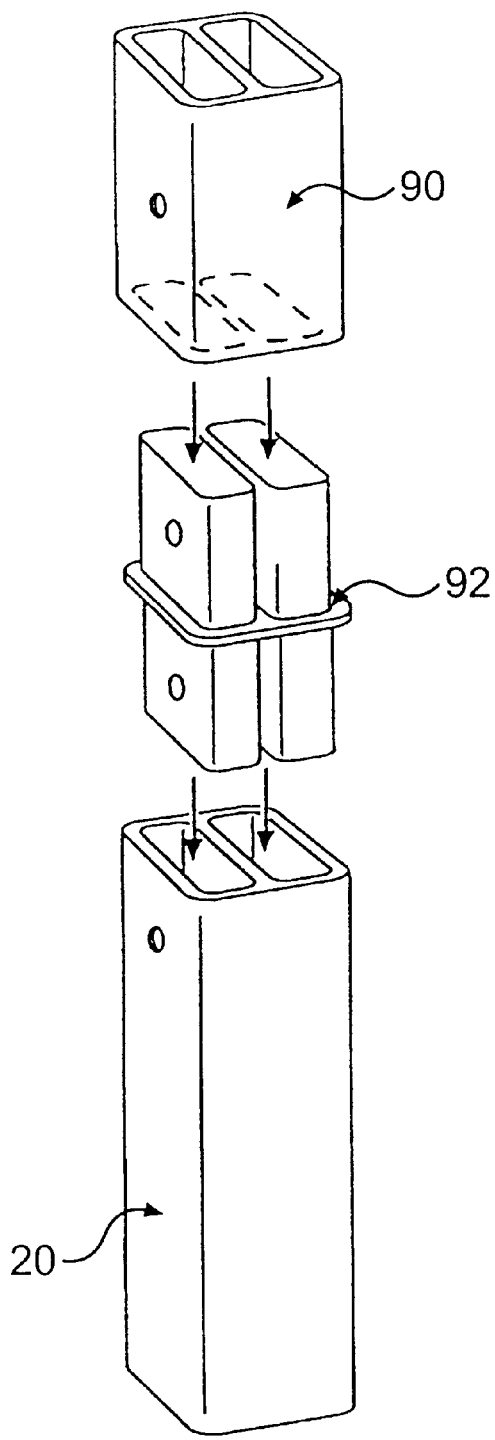
FIG. 6C is an exploded perspective view of a second embodiment of a stake extension of the present invention.
Figure 6D:
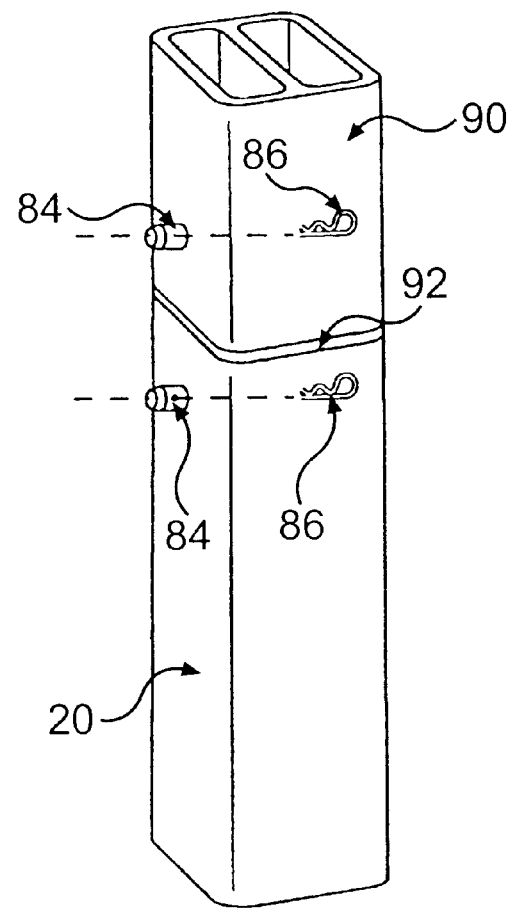
FIG. 6D is a perspective view of the second embodiment of the stake extension of the present invention in an assembled condition.

As shown in FIGS. 6A–6D, the stakes 20 may be extended through the use of extensions devices. FIG. 6A illustrates a stake 20 with a permanent extension block 88 welded to the stake 20. An extension 90 to the stake 20 is located immediately above the extension block 88. FIG. 6B illustrates a stake 20 with the extension block 88 welded to the top of the stake 20, and the extension 90 secured to the extension block 88 by a pin 84 in position with a lynch pin 86 which will secure the pin 84. FIG. 6C illustrates a stake 20 in a vertical position with an extension block 92 located above the stake 20. An extension 90 to the stake 20 is located immediately above the extension block 92. FIG. 6D shows a stake 20 with the extension block 92 and the corresponding extension 90. The extension block 92 and extension 90 are secured using pins 84 and corresponding lynch pins 86 to secure the pins 84.

Figure 7:
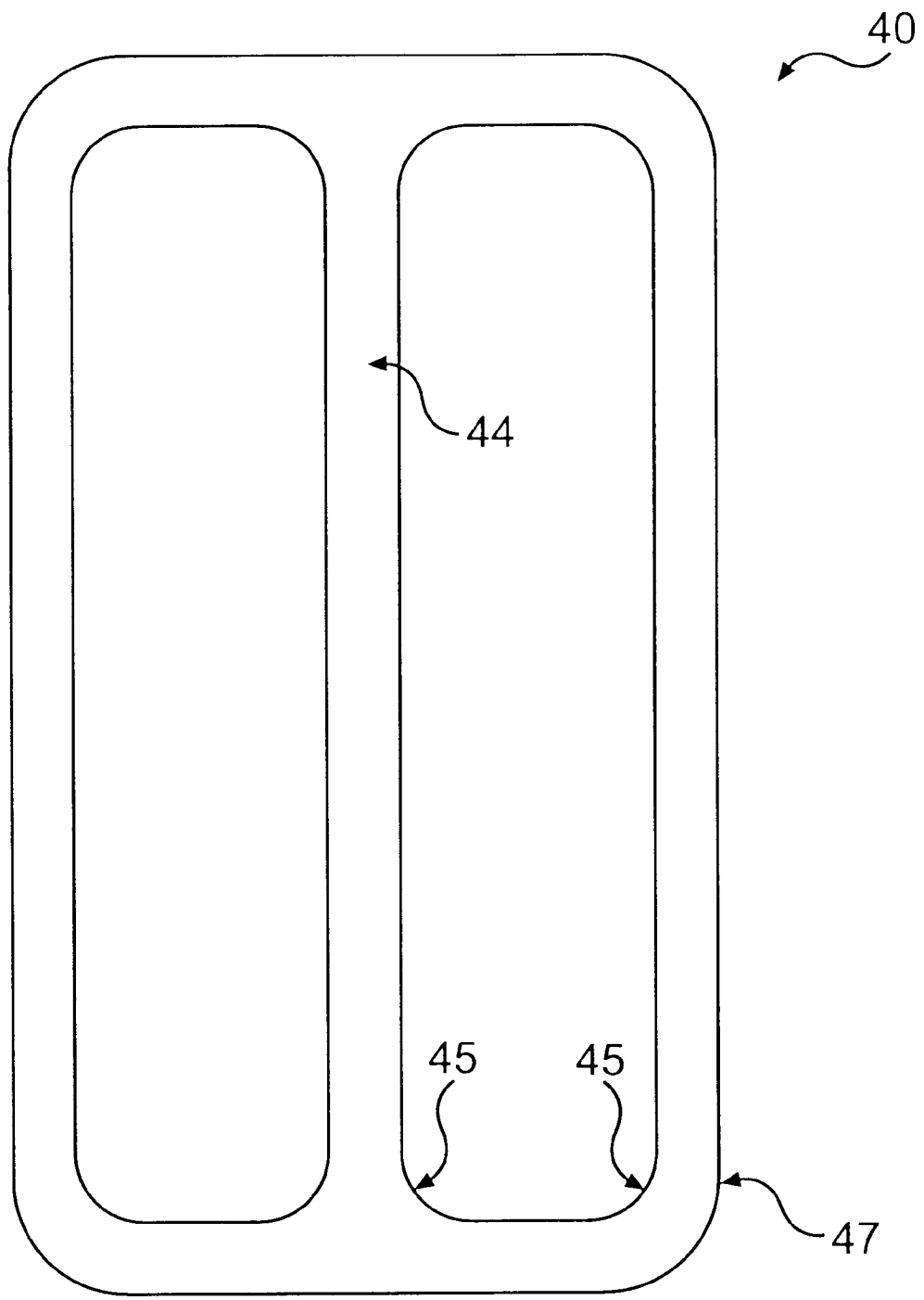
FIG. 7 is an end view of the bunk of the present invention.

FIG. 7 is an end view of the extruded bunk 40, which shows an internal wall or web 44 extending centrally across the bunk 40. The web 44 transverses the interior of the bunk 40 from top to bottom. The web 44 extends the complete length of the interior of the bunk 40. The lightweight bunk 40 is mounted in or on the bed of a truck or trailer 10. The bunk 40 is manufactured using an extrusion method, from aluminum or other lightweight metals or materials. The bunk 40 may be molded of steel or other ferrous metals. The bunk 40 may have a solid interior resulting from the original extrusion or as a result of the addition of other lightweight strengthening materials added thereto.

In this example, the overall width of the bunk 40 is 3.00", and the overall depth of the bunk 40 is 6.00". The thickness of the walls is 0.29", and the web 44 has a thickness of 0.29". The web 44 is formed during the extrusion process, and extends the complete length of the interior of the extruded bunk 40. The extruded bunk 40 has radiused corners 45, 47. The radius of the inside corners 45 is 0.29", and the radius of the outside corners 47 is 0.50". The web 44, along with the radiused corners 45, 47, adds significant strength to the bunk 40. It should be noted that the present invention is not limited to these particular dimensions. The extruded bunk 40 has a pocket on each end into which the aforementioned stake 20 is vertically inserted.

Figure 8:
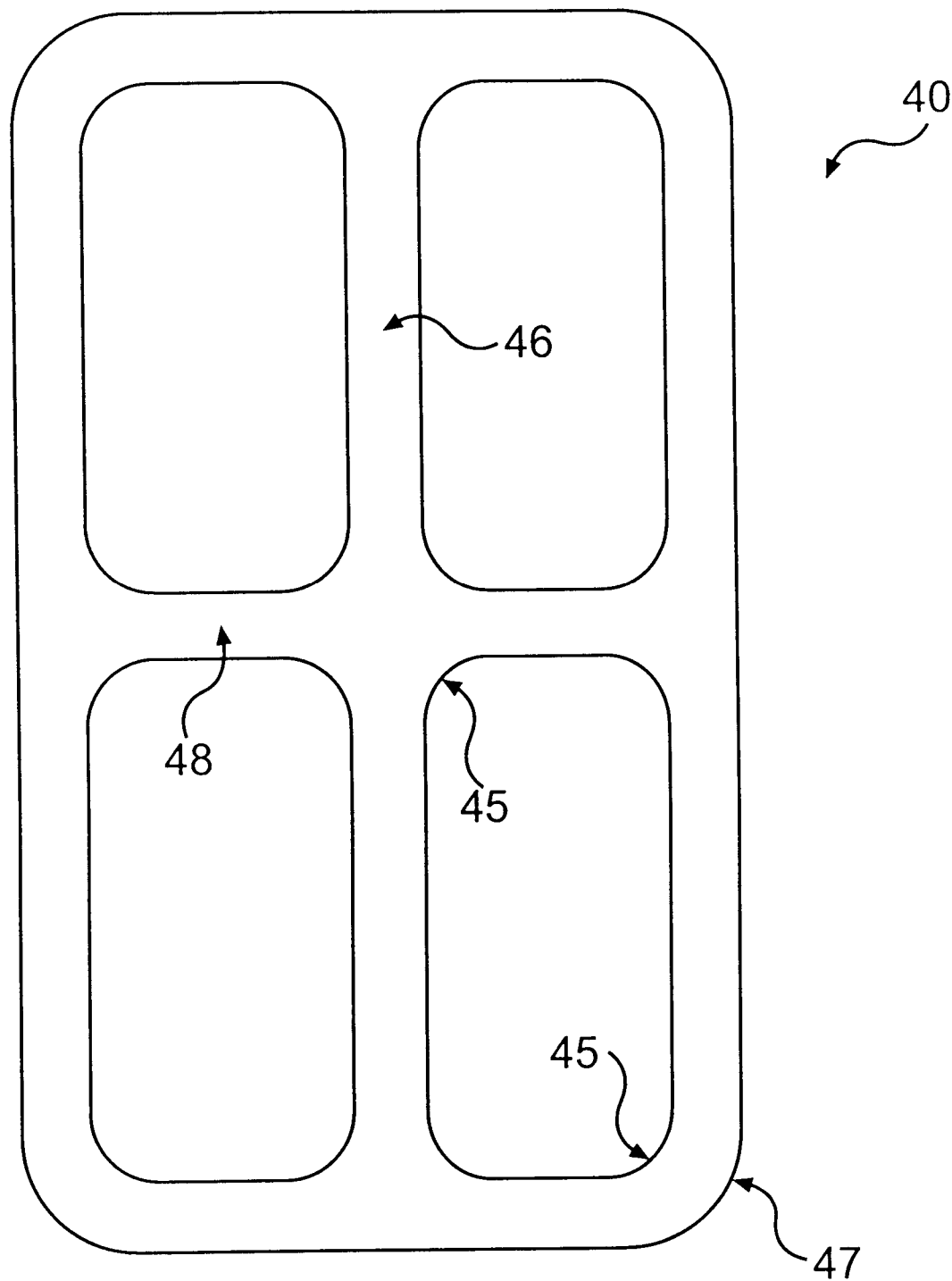
FIG. 8 is an end view of a second embodiment of a bunk of the present invention.

FIG. 8 shows an end view of an alternate embodiment of the bunk 40 of the present invention. The bunk 40 of FIG. 8 is a lightweight, extruded webbed bunk 40 with not only a first web 46 extending vertically, but also a second web 48 extending horizontally to further increase the dimensional stability and strength of the bunk 40.

Figure 9A:
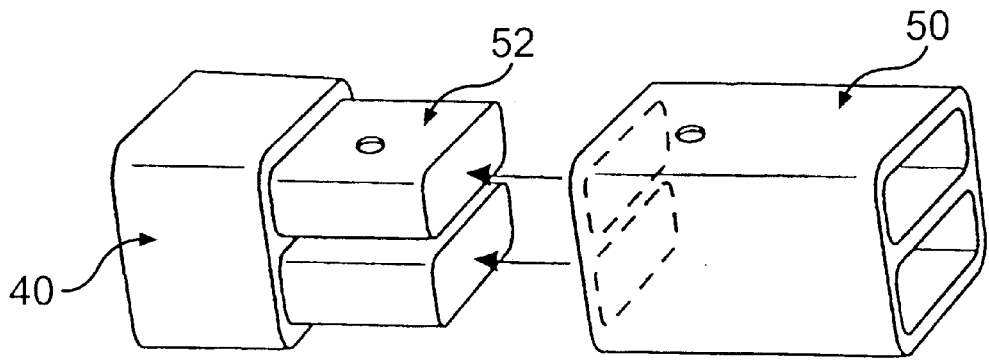
FIG. 9A is an exploded perspective view of a first embodiment of a bunk extension of the present invention.
Figure 9B:
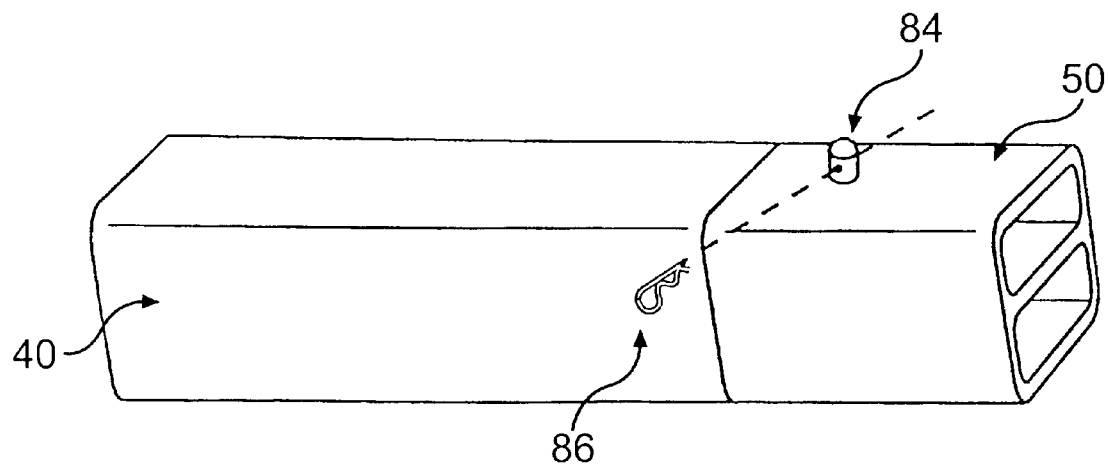
FIG. 9B is a perspective view of the first embodiment of the bunk extension of the present invention in an assembled condition.
Figure 9C:
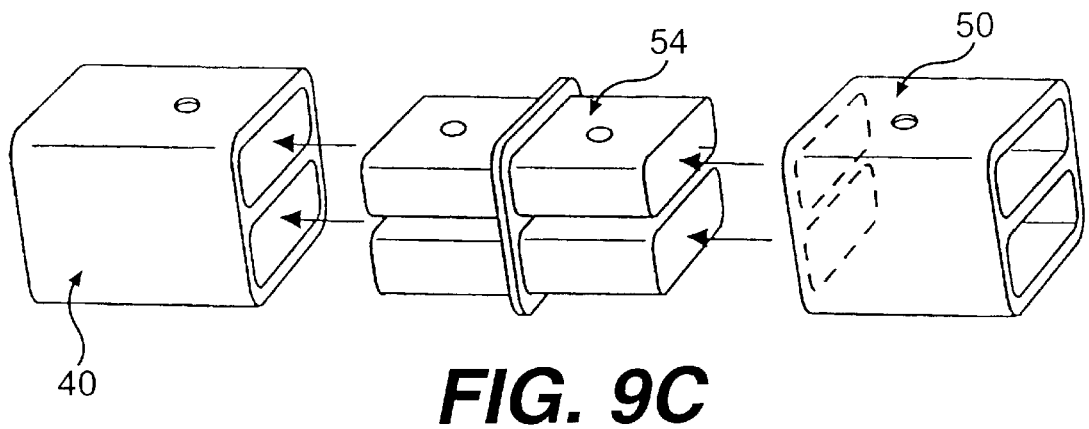
FIG. 9C is an exploded perspective view of a second embodiment of a bunk extension of the present invention.
Figure 9D:
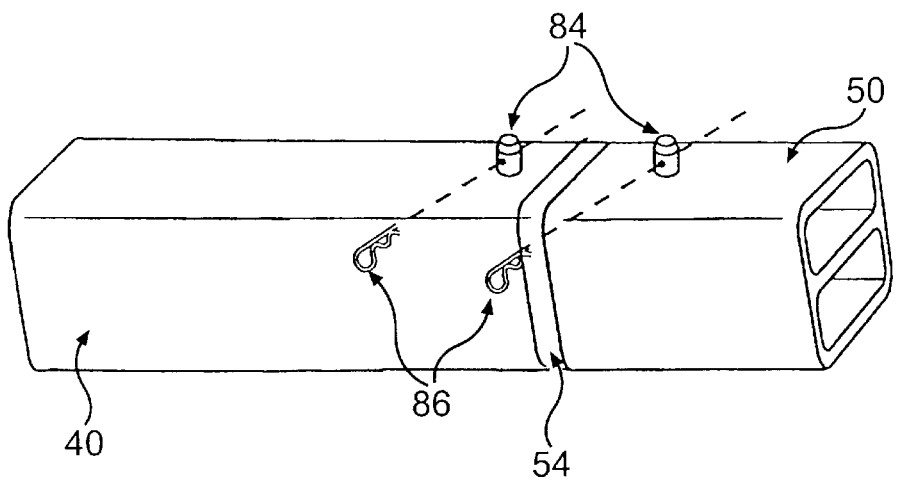
FIG. 9D is a perspective view of the second embodiment of the bunk extension of the present invention in an assembled condition.

As shown in FIGS. 9A–9D, the bunks 40 may be extended through the use of extensions devices. FIG. 9A illustrates a bunk 40 with the extension block 52 welded into the end of the bunk 40 with the extension 50 to the bunk 40 immediately to the right. FIG. 9B illustrates the bunk 40 with the extension 50 located on the extension block 52, and a pin 84 in position with a lynch pin 86 which will secure the pin 84. FIG. 9C shows a bunk 40 in a horizontal position with an extension block 54 and a corresponding extension 50 immediately to the right. FIG. 9D illustrates the bunk 40 with the extension 50 added using the extension block 54, and pins 84 in position and lynch pins 86 which secure the pins 84.

Figure 10:
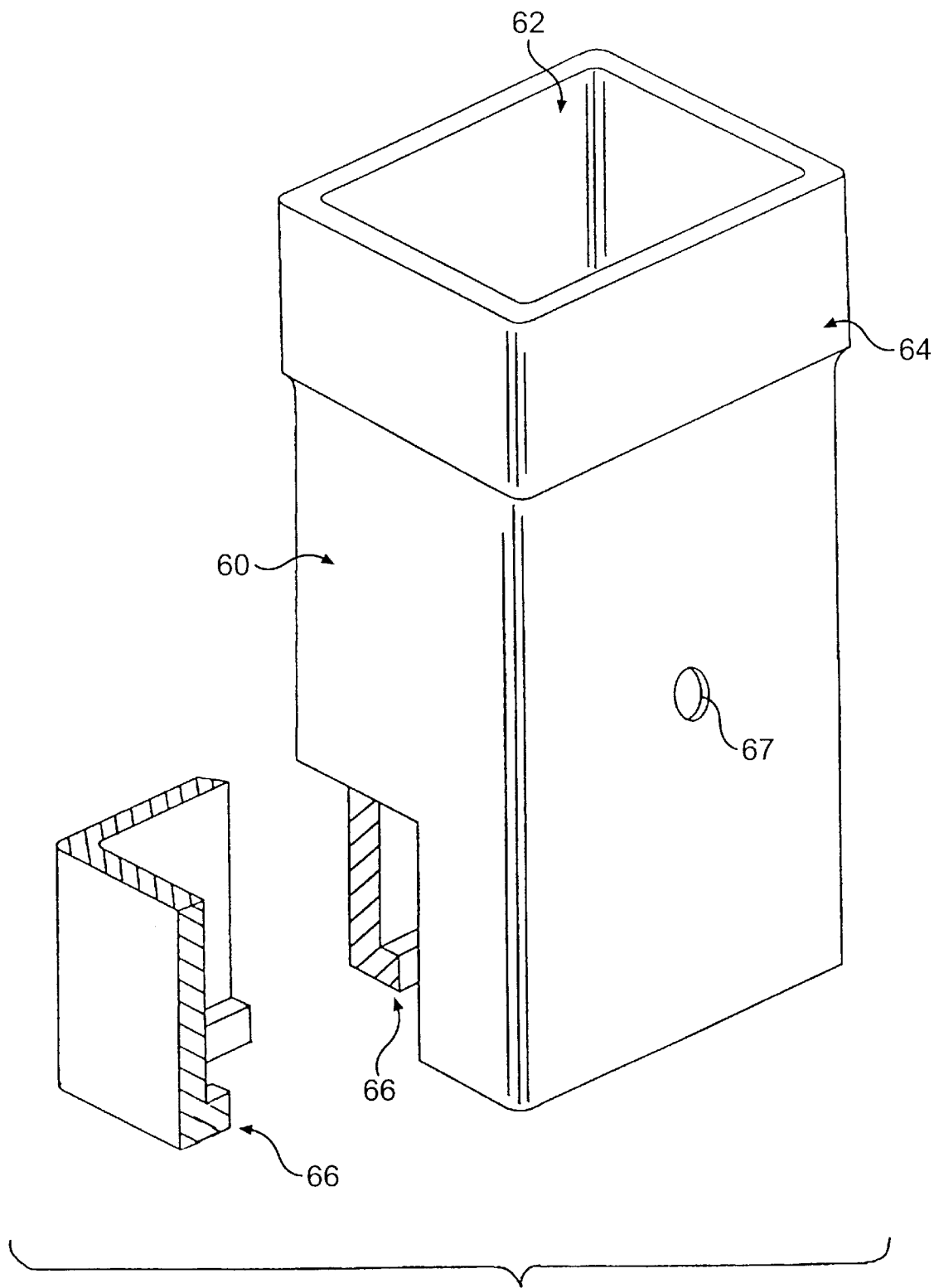
FIG. 10 is an exploded view of the bunk pocket of the present invention.

FIG. 10 illustrates the bunk pocket 60 including a cutaway section allowing the viewer to see the lip molded into the bottom of the pocket which restrains the stake 20 from passing through the pocket.

The bunk pocket 60 is manufactured from aluminum or other lightweight metals or materials using a casting or injection molding method. 17. The bunk pocket 60 may also be molded of steel or other ferrous metals. The bunk pocket 60 may also be molded of titanium or other non-ferrous metals or materials. The overall dimensions of the bunk pocket 60 are 5.25"×4.26"×8.0". The bunk pocket 60 is welded to each end of the bunk 40. Each bunk pocket 60 has an opening 62 on the top which measures approximately 3"×4" into which an extruded stake 20 can be inserted. Depending on the height of the stake 20, the total volumetric area of the vehicle or trailer 10 can be increased or decreased.

A thickened shoulder 64 is molded around the top of the bunk pocket 60 and is approximately 0.63" thick. The shoulder 64 extends downwardly from the top of the bunk pocket 60 by about 1" to assure the bunk pocket 60 can withstand the stress transferred to it as a result of the outward pressure placed on the stakes 20 by the load of logs 12 or other cargo. Also molded into the bunk pocket 60 is a lip at the bottom of the bunk pocket 60 that keeps the stake 20 from sliding through the bunk pocket 60. The wall thickness in the area between the shoulder 64 and the lip 66 is about 0.31", while the wall thickness including the lip 66 is about 0.69" and extends up from the bottom of the bunk pocket 60 by about 0.38".

Figure 11:
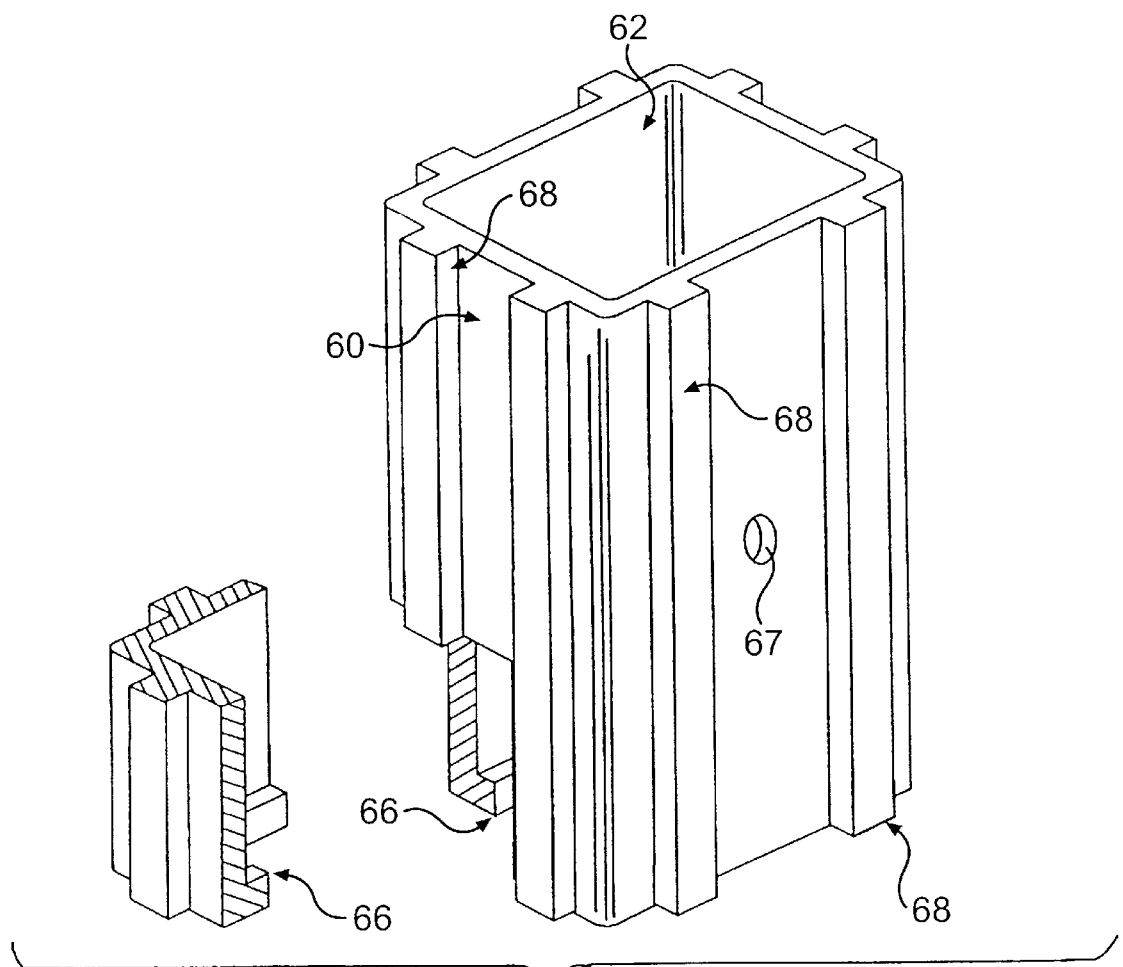
FIG. 11 is an exploded view of a second embodiment of a bunk pocket of the present invention.

FIG. 11 illustrates an alternate embodiment of the bunk pocket 60 including a cut-away section allowing the viewer to see the lip 66 molded into the bottom of the bunk pocket 60. The lip 66 restrains the stake 20 from passing through the bunk pocket 60. Also illustrated are a series of buttresses 68 and an increase in the wall thickness added to the bunk pocket 60 to further increase the dimensional stability and strength of the bunk pocket 60. Although buttresses 68 are shown running vertically, they may also be positioned in a horizontal fashion running around the exterior of the bunk pocket 60.

Figure 12:
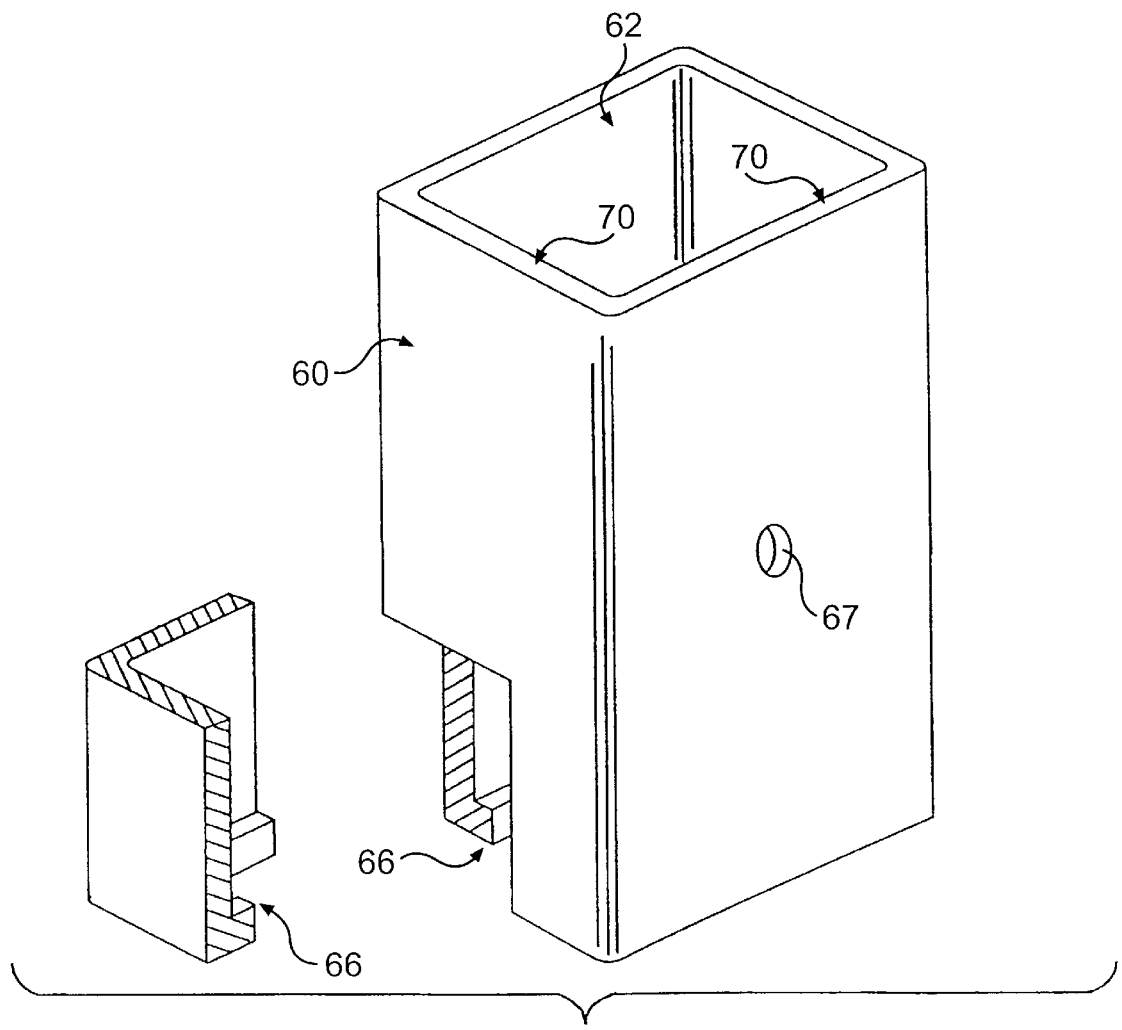
FIG. 12 is an exploded view of a third embodiment of a bunk pocket of the present invention.

FIG. 12 illustrates a further embodiment of the bunk pocket 60 including a cut-away section allowing the viewer to see the lip 66 molded into the bottom of the bunk pocket 60. The lip 66 restrains the stake 20 from passing through the bunk pocket 60. The walls 70 of the entire bunk pocket 60 have an increased thickness over the entire bunk pocket 60, thereby increasing the dimensional stability and strength of the bunk pocket 60.

Figure 13:
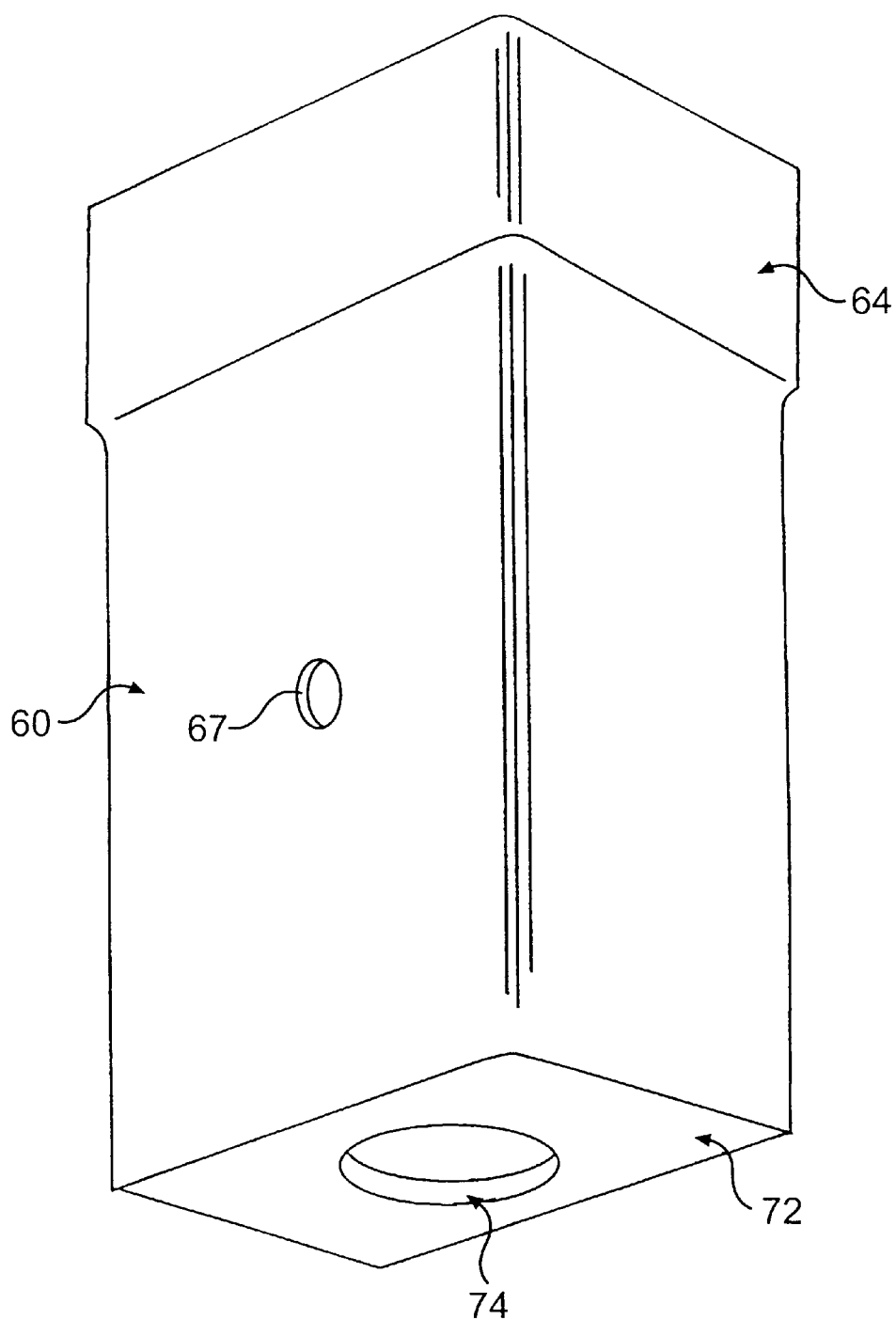
FIG. 13 is a perspective view of a fourth embodiment of a bunk pocket of the present invention.

FIG. 13 illustrates a further embodiment of the bunk pocket 60 which includes a solid bottom 72 which restrains the stake 20 from passing through the bunk pocket 60. A drain hole 74 is provided in the bottom 72 which allows water and debris to fall out the bottom of the bunk pocket 60. The drain hole 74 is approximately 1.5" in diameter. The solid bottom 72 increases the dimensional stability and strength of the bunk pocket 60 for supporting the stake 20 which is inserted in the bunk pocket 60.

Figure 14A:
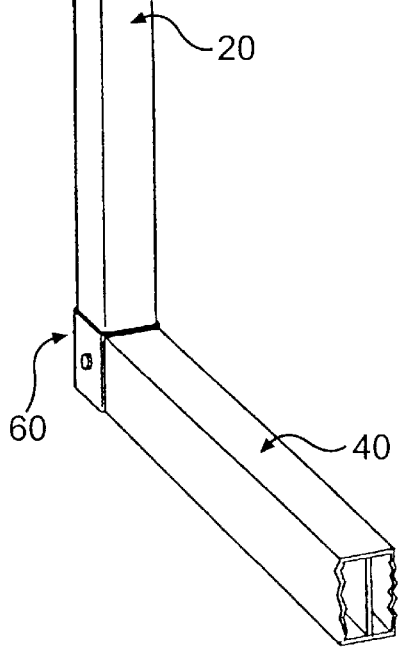
FIG. 14A is a perspective view showing the stake secured to the bunk of the present invention.
Figure 14B:
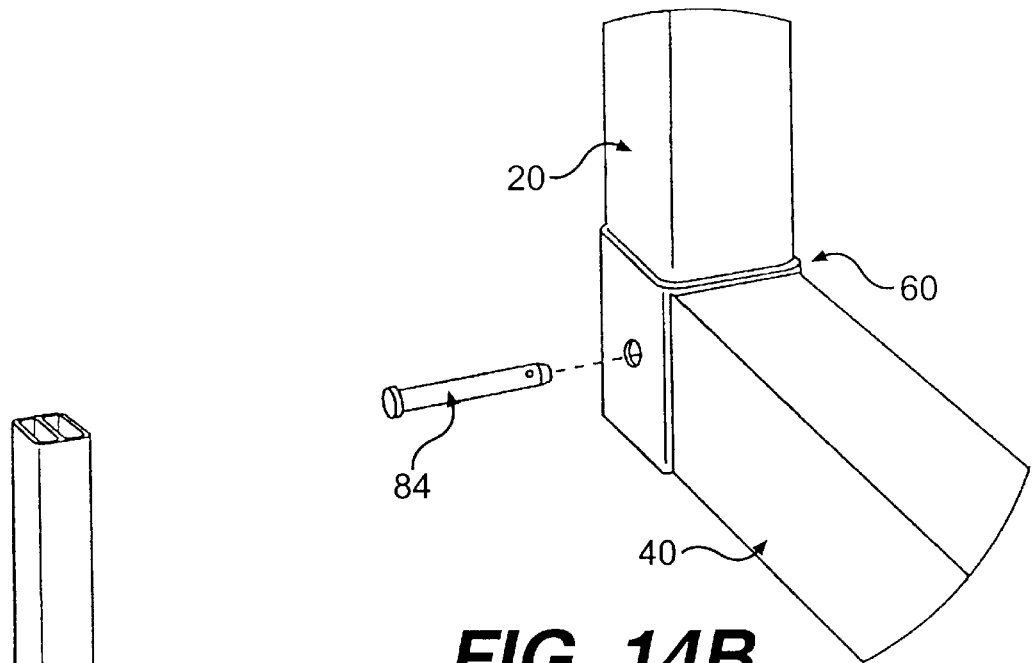
FIGS. 14B and 14C are detail views showing the stake securing pin and bunk of FIG. 14A.
Figure 14C:
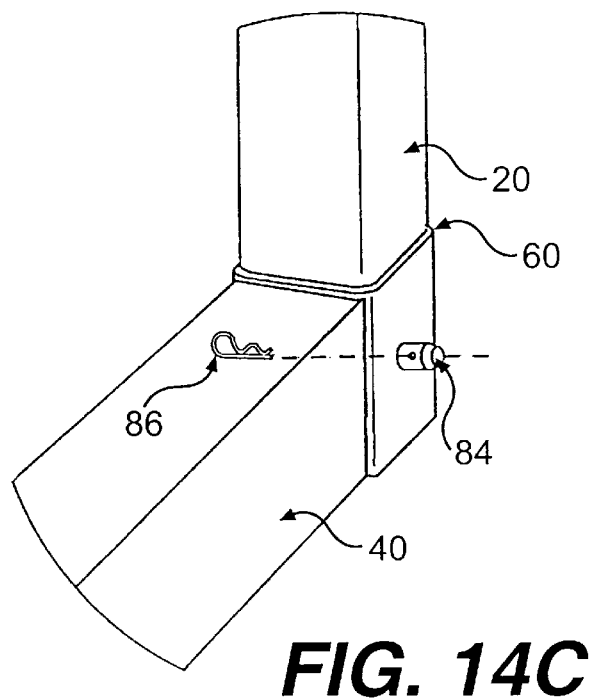

FIGS. 14A–14C illustrate the method of securing the stake 20 to the bunk pocket 60 of the bunk 40 through the use of a pin 84. The pin 84 is secured after passing through the bund pocket 60 and the stake 20 with a lynch pin 86.

Once the stake 20 has been inserted into the bunk 40 and is resting in the bunk pocket 60, the stake 20 is secured in the bunk pocket 60 by inserting a pin 84 having a diameter of ⅝" through both the bunk pocket 60 and the stake 20 via a centered $^{13}/_{16}$" hole bored through the bunk pocket 60 and the hole in the stake 20 that is ¾". The pin 84 is then secured in place by inserting a $^{3}/_{16}$" lynch pin 86 through a ¼" hole, located approximately 5" from the head of the pin 84, and bored through the diameter of the pin 84. The stakes 20 may also be permanently secured into bunk pockets 60 via welding or other permanent securing methods.

FIGS. 15a and 15b illustrate the stakes 20 being repositioned by an operator 18 standing on the ground 16. Also illustrated is the repositioning of stakes 20 from the sides of the trailer 10 to the back of the trailer 10, once again while the operator 18 remains on the ground 16.

Typically with steel stakes 20, the operator 18 must get up onto the bed of the truck or trailer 10 to move the stakes 20 due to their weight. This repositioning of the stakes 20 is necessary to accommodate logs 12 of a different length than the ones that comprised the previous load. Repositioning of the stakes 20 is necessary to accommodate logs 12 that will be loaded perpendicular to the length of the trailer 10 or truck as opposed to parallel to the length of the trailer 10 or truck, or visa-versa. Thus, stakes 20 must be moved from the side of the trailer 10 to the front and rear of the trailer 10. Because of the extreme weight of steel stakes 20, the operator 18 must get up on the bed of the trailer 10 to control the stake 20 by grasping it close to its center point. The aluminum stakes 20 afford the operator 18 the ability to change the position of the stakes 20 from the ground 16 without getting up on the bed of the truck or trailer 10 because, due to the reduced weight, control of the stake 20 may be maintained without grasping it near its center point. The reduced weight of the aluminum stakes 20 makes repositioning stakes 20 faster, safer and easier as the repositioning may be done from the ground 16.

An analysis was performed by comparing the relative strength of current steel bunks and stakes to that of aluminum counterparts formed according to the present invention. A test load was developed using the known maximum payload of a trailer 10, approximately 70,000 pounds. The current steel stakes, bunks and bunk pockets are made from a 50,000 psi yield strength material. The design is stable and very few failures were seen. Thus, if an aluminum bunk 40, bunk pocket 60 and stake 20 could be made to be as strong as steel, they too should show similar stability under the 70,000 pound load.

The stake 20 modeled was made of 6061 T6 aluminum and had a cross section as shown in FIG. 4. The stake 20 was tested individually verses its steel counterpart. The bunk 40 modeled in the test was made of 6061 T6 aluminum and had a cross-section as shown in FIG. 7. The bunk 40 measured 3 inches by 6 inches, and had a ⅜ inch wall thickness. The bunk pocket 60 in the test was made of ⅜ inch thick 6061 T6 aluminum and had a shape as shown in FIG. 10.

A first test was performed to determining the tensile strength. The stakes 20 and bunks 40 were modeled together for a realistic stress test. A load of 4,000 pounds was applied to the top side of the bunk 40. The load was derived by using 70,000 pound payload divided by the 8 bunks 40 that would be on the trailer 10. This number was then divided into uniform loads that would sit above the frame rails and on each side of the frame rails. The model is only of the bunk 40 from the inside of the frame rail to the outside of the trailer 10. A 1,500 pound load was applied to the inside face of the stake 20. This load simulates the force of the logs 12 wanting to roll off the pile and exerting force against the stake 20. This load also simulates the force of the loader pushing the logs 12 down to situate them.

A second test was performed to determine the endurance The stakes 20 and bunks 40 were put through a test consisting of 500 million high stress loading cycles. This exceeds the normal number of stress cycles in the usual life of a stake 20 and a bunk 40. The normal number of stress cycles in the life of a bunk 40 and stake 20 is 3,120,000 cycles. The following chart illustrates the calculations used to determine the number of stress cycles in the life of a stake 20 and bunk 40:

| Operation | No. of Stress Cycles | Times Per Day |
|-----------|---------------------|---------------|
| Loading   | 40                  | 4             |
| Hauling   | 20                  | 4             |
| Unloading | 40                  | 4             |

Total per day=400
Total per week (6-day work week)=2400
Total per year (52 weeks per year)=124,800
Total per life (25 years)=3,120,000

The number of high stress cycles is less than 500 million in the lifetime of this invention, and the minimum yield strength is higher than 20,000 psi. "The force applied to an element divided by the area to which the force is applied is known as stress. For example, if a 10" by 10" square column carries a 120,000 pound load, it's stress is calculated by dividing 120,000 by 100, which equals 1,200 pounds per square inch, abbreviated 1,200 psi.

The results of the load carrying tests reveal that the aluminum design is 25 percent stronger than the steel design. The 6061-T6 aluminum used in the second test has a yield strength of approximately 40,000 psi compared to steels rated 50,000 psi, which makes the aluminum 20 percent weaker than the steel counterpart. Although weaker than the steel in psi, the aluminum well exceeds the federal regulations on stakes. Stress plots generated revealed that the aluminum extrusion stakes 20 of this invention show stress levels lower than that of steel stakes. The steel has the initial advantage in terms of ultimate tensile strength (psi), but this invention has a fifty-four percent lower stress level, and it is twice as strong as a steel stake.

Radiused corners must carry their own weight plus the pressure of a load placed within the confines of the trailer 10 or truck. Because of the arch action of horizontal curvatures, the pressure of loads against the face of the stakes 20 is channeled to the sides of the stake 20 that are perpendicular to the load (see FIG. 4) and ultimately to the bunk 40 and bunk pocket 60, into which the stake 20 is secured. Loads accumulate along vertical medians, and they become more and more compressed as they approach the radiused corners (see FIG. 4). As in the construction of arches, radiuses corners provide additional strength. This invention complies with the configuration of a monolithic structure, allowing for the reduction in the wall thickness of the extruded stake 20, as loads, and the force of the load is distributed more evenly to the sides of the stake 20.

The continuity of radiused corners allows such reduction of thickness by introducing actions along horizontal sections or parallels that prevent the sides of the stake 20 from being distorted. The parallels or walls of the stake 20 behave like the curvatures of an arch. Further, the additional member or centrally located web 24 allows the stake 20 to twist as a result of load stress to a greater extent, without failure of the stakes 20 structural integrity. The centrally located web 24 member adds additional strength and rigidity to the stake 20.

The aluminum from which the stake 20, bunk 40 and bunk pocket 60 is extruded affords greater corrosion resistance than similar ferrous or ferrous alloy materials, The aluminum and the corresponding resistance to corrosion affords the stakes 20, bunks 40 and bunk pockets 60 a greater life span, particularly in locations where salt is used on road surfaces.

The aluminum composition and structural configuration of the stakes 20 affords persons who must insert and remove the stakes 20 greater ease and safety in handling the stakes 20 as a result of the decreased weight of the stake 20. The aluminum stakes 20 afford the operator 18 the ability to change the position of the stakes 20 without getting up on the bed of the truck or trailer 10.

The bunk pockets 60 are attached to the bunk 40 which is correspondingly integrated into a frame 14 of the trailer 10 or truck. The stakes 20 may be used alone without the aluminum bunk 40 or bunk pocket 60, or along with either the bunk pocket 60 or the bunk 40.

It is to be understood that the invention is not limited to the numerical, material, or structural configurations in the descriptions in the above embodiment. Further, the elements, stake 20, bunk 40, and bunk pockets 60 can be used individually or in combination with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for constraining a load comprising:
   a bunk;
   a bunk pocket supported by said bunk; and
   a stake vertically positionable in said bunk pocket,
      said stake comprising an extruded hardened aluminum main body having a centrally located supporting web integrally formed therein traversing the depth of said stake, the web being positioned perpendicular to a load it will constrain and extending the complete length of the interior of said stake, said stake including internally and externally radiused corners which add to the structural integrity of said stake, the radiused corners of the stake, on the outside corners, internally and externally, and internally adjacent to the centrally located web, transfer the pressure of the load constrained by said stakes to all the perpendicular members of said stake, walls and web.

2. The apparatus of claim 1, wherein said stake includes a plurality of internal webs, at least one of which extends parallel to the force exerted by the load.

3. The apparatus of claim 1, wherein said stake includes lightweight strengthening materials added therein.

4. The apparatus of claim 1, wherein said stake may be lengthened as a result of the insertion of an extension block into the end of said stake onto which another length of stake may be added, said extension block and stake extension being secured with a pin and said pin being secured with a lynch pin.

5. The apparatus of claim 1, wherein said stake has a male end matching the female opening of another section of extruded stake so as to extend the height of said stake.

6. The apparatus of claim 1, wherein said bunk is molded of steel or other ferrous metals.

7. The apparatus of claim 1, wherein said bunk pocket is molded of titanium or other non-ferrous metals or materials.

8. An apparatus for constraining a load comprising:

a bunk;

a bunk pocket supported by said bunk; and a stake vertically positionable in said bunk pocket, said bunk comprising an extruded hardened aluminum main body having a centrally located supporting web integrally formed therein traversing the depth of said bunk, the web being positioned perpendicular to a load it will constrain and extending the complete length of the interior of said bunk, said bunk including internally and externally radiused corners which add to the structural integrity of said bunk, the radiused corners of the bunk, on the outside corners, internally and externally, and internally adjacent to the centrally located web, transfer the pressure of the load constrained by said bunk to all the perpendicular members of said bunk, walls and web.

9. The apparatus of claim 8, wherein said bunk is molded of steel or other ferrous metals.

10. The apparatus of claim 8, wherein said bunk pocket is molded of titanium or other non-ferrous metals or materials.

11. The apparatus of claim 8, wherein said bunk includes a plurality of internal webs, at least one of which extends parallel to the force exerted by the load.

12. The apparatus of claim 8, wherein said bunk includes lightweight strengthening materials added therein.

13. The apparatus of claim 8, wherein said bunk may be lengthened as a result of the insertion of an extension block into the end of said bunk onto which another length of bunk may be added, said extension block and bunk extension being secured with a pin and said pin being secured with a lynch pin.

14. The apparatus of claim 8, wherein said bunk has a male end matching the female opening of another section of extruded bunk so as to extend the length of said bunk.

15. An apparatus for constraining a load comprising:

a bunk;

a bunk pocket supported by said bunk; and a stake vertically positionable in said bunk pocket, said bunk pocket comprising:

a thickened shoulder, said shoulder being molded into the configuration of the bunk pocket;

a retaining lip molded into the configuration of the bunk pocket at the bottom of said bunk pocket to keep the stake from sliding through the bunk pocket, said lip being cast or injection molded using aluminum or other lightweight materials; and a horizontally bored hole passing through the bunk pocket, said hole being positioned to correspond with a hole in the stake which is inserted in the bunk pocket, the holes through the bunk pocket and the stake allow a retaining pin to be passed through both holes and secured with a lynch pin, thus securing the stake in the pocket.

16. The apparatus of claim 15, wherein said bunk pocket is molded of steel or other ferrous metals.

17. The apparatus of claim 15, wherein said bunk pocket is molded of titanium or other non-ferrous metals or materials.

18. The apparatus of claim 15, wherein said bunk pocket is molded to extend the shoulder thickness the entire height of the bunk pocket.

19. The apparatus of claim 15, wherein said bunk pocket is molded with a plurality of external buttresses to strengthen the bunk pocket.

20. The apparatus of claim 15, wherein said bunk comprises an extruded hardened aluminum main body having a centrally located supporting web integrally formed therein traversing the depth of said bunk, the web being positioned perpendicular to a load it will constrain and extending the complete length of the interior of said bunk, said bunk including internally and externally radiused corners which add to the structural integrity of said bunk, the radiused corners of the bunk, on the outside corners, internally and externally, and internally adjacent to the centrally located web, transfer the pressure of the load constrained by said bunk to all the perpendicular members of said bunk, walls and web, and wherein said stake comprises an extruded hardened aluminum main body having a centrally located supporting web integrally formed therein traversing the depth of said stake, the web being positioned perpendicular to a load it will constrain and extending the complete length of the interior of said stake, said stake including internally and externally radiused corners which add to the structural integrity of said stake, the radiused corners of the stake, on the outside corners, internally and externally, and internally adjacent to the centrally located web, transfer the pressure of the load constrained by said stakes to all the perpendicular members of said stake, walls and web.

* * * * *